US008600747B2

(12) United States Patent
Abella et al.

(10) Patent No.: US 8,600,747 B2
(45) Date of Patent: *Dec. 3, 2013

(54) METHOD FOR DIALOG MANAGEMENT (75) Inventors: Alicia Abella, Morristown, NJ (US);
Allen Louis Gorin, Berkeley Heights, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1062 days.

This patent is subject to a terminal disclaimer.

(21) Appl. No.: 12/140,805

(22) Filed: Jun. 17, 2008

(65) Prior Publication Data

US 2008/0247519 A1    Oct. 9, 2008

Related U.S. Application Data

(63) Continuation of application No. 11/548,899, filed on Oct. 12, 2006, now Pat. No. 7,403,899, which is a continuation of application No. 10/269,502, filed on Oct. 11, 2002, now Pat. No. 7,167,832.

(60) Provisional application No. 60/329,442, filed on Oct. 15, 2001.

(51) Int. Cl.
*G10L 15/00* (2013.01)
*G06F 17/27* (2006.01)
*G06F 3/048* (2013.01)
*G06F 9/46* (2006.01)
*G06F 9/44* (2006.01)
*G06F 17/20* (2006.01)
*G10L 21/00* (2013.01)
*G10L 15/26* (2006.01)
*H04M 1/64* (2006.01)
*H04M 11/00* (2006.01)

(52) U.S. Cl.
USPC ............... 704/239; 704/9; 704/275; 704/277; 704/235; 704/254; 379/86.03; 379/88.04; 379/88.14; 715/811; 718/102; 706/11; 717/100

(58) Field of Classification Search
USPC ............. 704/239, 275, 9, 251, 254, 235, 277; 715/811; 379/88.03, 88.04, 88.14; 718/102; 706/11; 717/100
See application file for complete search history.

(56) References Cited

U.S. PATENT DOCUMENTS 5,694,558 A    12/1997   Sparks et al.
6,029,188 A *   2/2000   Uyama ........................ 718/102
(Continued)

FOREIGN PATENT DOCUMENTS

WO    WO 00/65814    11/2000

OTHER PUBLICATIONS

A Distributed Architecture for Cooperative Spoken Dialogue Agents with Coherent Dialogue State and History by Bor-shen Lin, Hsin-min Wang and Lin-Shan Lee, Department of Electrical Engineering, National Taiwan University, Institute of Information Science, Academia Sinica, Taipei, Taiwan, Republic of China as published in ASRU, 1999.*

(Continued)

*Primary Examiner* — Edgar Guerra-Erazo
*Assistant Examiner* — Neeraj Sharma (57) ABSTRACT

A spoken dialog system and method having a dialog management module are disclosed. The dialog management module includes a plurality of dialog motivators for handling various operations during a spoken dialog. The dialog motivators comprise an error handling, disambiguation, assumption, confirmation, missing information, and continuation. The spoken dialog system uses the assumption dialog motivator in either a-priori or a-posteriori modes. A-priori assumption is based on predefined requirements for the call flow and a-posteriori assumption can work with the confirmation dialog motivator to assume the content of received user input and confirm received user input.

20 Claims, 4 Drawing Sheets

(56) References Cited

U.S. PATENT DOCUMENTS

| | | | |
|---|---|---|---|
| 6,044,347 A | | 3/2000 | Abella et al. |
| 6,233,561 B1 | * | 5/2001 | Junqua et al. ............... 704/277 |
| 6,246,981 B1 | * | 6/2001 | Papineni et al. ............. 704/235 |
| 6,356,869 B1 | * | 3/2002 | Chapados et al. ............ 704/275 |
| 6,505,162 B1 | | 1/2003 | Wang et al. |
| 6,507,643 B1 | * | 1/2003 | Groner ....................... 379/88.14 |
| 6,510,411 B1 | * | 1/2003 | Norton et al. ................ 704/254 |
| 6,609,091 B1 | * | 8/2003 | Budzinski ........................ 704/9 |
| 6,748,353 B1 | * | 6/2004 | Iliff ................................ 704/9 |
| 6,789,252 B1 | * | 9/2004 | Burke et al. ................. 717/100 |
| 6,799,169 B1 | * | 9/2004 | Coffman et al. ............... 706/11 |
| 6,941,266 B1 | | 9/2005 | Gorin et al. |
| 6,964,023 B2 | * | 11/2005 | Maes et al. ................... 715/811 |
| 7,177,402 B2 | * | 2/2007 | Metcalf ...................... 379/88.03 |
| 2002/0184023 A1 | * | 12/2002 | Busayapongchai et al. .. 704/251 |
| 2003/0130849 A1 | | 7/2003 | Durston et al. |

OTHER PUBLICATIONS

J. Wright, et al, "Spoken Language Understanding Within Dialogue Using a Graphical Model of Task Structure", Proc. ICSLP, Sydney, Nov. 1998.

B. Buntschuh, et al, "VPQ: A Spoken Language Interface to Large Scale Directory Information", Proc. ICSLP, Sydney, Nov. 1998.

A. Gorin, et al, "How May I Help You?", Speech Communication, vol. 23, 1997, pp. 113-127.

M. McTear, "Spoken Dialogue Technology: Enabling the Conversational User Interface", Submitted to ACM Computing Surveys 2001.

A. Abella, et al, "Generating Semantically Consistent Inputs to a Dialog Manager", Eurospeech, Rhodes, Sep. 1997.

Cohen, P. "Models of Dialogue," Proc. of the Fourth NEC Research Symposium, 1994, SIAM Press.

Andernach, et al, "Finding Classes of Dialogue Utterances with Kohonen Networks," Proc. of the NLP Wkshp for the European Conf. on Machine Learning (ECML), 1997, Prague, Czech.

Heeman, P.A., et al, "Beyond Structured Dialogues: Factoring Out Grounding," Proc. Of the Int. Conf. on Spoken Language Processing, 1998, Sydney, Australia.

Sparks et al. "An object-oriented approach to dialogue management in spoken language systems," Conference on Human Factors in Computing Systems, ACM Press, 1994, pp. 211-217, Boston, Massachusetts.

Abella et al. "Construct algebra: analytical dialog management," Proceedings of 37$^{th}$ Annual Meeting of the Asso for Computational Linguistics, 1999, pp. 191-199.

Souvignier, et al. "The thoughtful elephant: strategies for spoken dialog systems," IEEE Transactions on Speech and Audio Processing, vol. 8, Issue 1, Jan. 2000, pp. 51-62.

Glass et al. "Flexible and personalizable mixed-initiative dialogue systems," HLT-NAACL 2003 Workshop on Research Directions in Dialogue Processing, Edmonton, Canada, 2003.

Cox et al. "Speech and language processing for next-millennium communications services," Proceedings of the IEEE, Aug. 2000, vol. 88, Issue 8, pp. 1314-1337.

Maes, S. "A re-entrant reusable dialog component framework for context sharing and mixed initiative," IEEE international Conference on Multimedia and Expo, 2001, Aug. 22-25, 2001, pp. 733-736.

Hanrieder, G. "Integration of a mixed-initiative dialogue manager into commercial IVR platforms," IEEE Proceedings Interactive Voice Technology for Telecommunications Applications, Torino, Italy, 1998, pp. 77-82.

Sedgwick, N. "Experiences in dialogue design and implementation for a telephone banking project," IEE Colloquium on Interactive Spoken Dialogue Systems for Telephony Applications, Nov. 3, 1999, pp. 2/1-2/6.

\* cited by examiner

| SYSTEM | USER |
|---|---|
| WHAT IS YOUR PHONE NUMBER ? | 555-1235 |
| WAS THAT 555-1235 ? | NO |
| I'M SORRY, PLEASE SAY YOUR PHONE NUMBER AGAIN? | IT IS 555-1234 |
| WAS THAT 555-1234 ? | YES |

210 — WHAT IS YOUR PHONE NUMBER?
212 — 555-1235
214 — WAS THAT 555-1235?
216 — NO
218 — I'M SORRY, PLEASE SAY YOUR PHONE NUMBER AGAIN?
220 — IT IS 555-1234
222 — WAS THAT 555-1234?
224 — YES

FIG. 8

| SYSTEM | USER |
|---|---|
| HOW MAY I HELP YOU? | I HAVE A QUESTION ABOUT MY BILL |
| OKAY, WHAT IS YOUR QUESTION ? | I HAVE SOME CHANGES HERE THAT I DO NOT UNDERSTAND |
| MAY I HAVE YOUR HOME PHONE NUMBER ? | 555-1234 |
| PLEASE HOLD WHILE I TRANSFER YOUR CALL | IVF/CUSTOMER REPRESENTATIVE |

FIG. 9

260 — ( =$C_T$/CKey <- $C_C$)/(KEY <- $C_I$)/Val/Main
STEP 1
STEP 2
STEP 3
STEP 4

METHOD FOR DIALOG MANAGEMENT

PRIORITY APPLICATION

The present application is a continuation of U.S. patent application Ser. No. 11/548,899, filed Oct. 12, 2006, which is a continuation of U.S. patent application Ser. No. 10/269,502, filed Oct. 11, 2002, which claims priority to U.S. Patent Application No. 60/329,442, filed Oct. 15, 2001, the contents of which are incorporated herein by reference.

RELATED APPLICATION

The present application is related to U.S. patent application Ser. No. 10/269,449, filed Oct. 11, 2002, entitled "System for Dialogue Management" incorporated herein by reference. The related application is assigned to the assignee of the present application.

BACKGROUND OF THE INVENTION

1. Field of the Invention

The present invention relates to speech technology and more specifically to a system and method of developing a general dialog principle from conception to implementation as part of a dialog manager library of dialog motivators.

2. Discussion of Related Art

In the process of carrying on an intelligent conversation between a human user and a computer, the computer must perform numerous complicated processes. Those of skill in the art understand the basic modules necessary for receiving voice signals from the user, processing those signals and formulating a response from the computer. In a typical dialog system, an automatic speech recognition (ASR) module interprets the text of the user speech. A spoken language understanding (SLU) module receives the ASR text and seeks to determine or understand the meaning of the text. A dialogue manager (DM) receives the meaning of the user speech and formulates an appropriate response. The text comprising the computer response is converted to audible and synthetic speech sounds via a text-to-speech (TTS) module.

This disclosure relates to technologies associated with the DM. Many spoken dialog systems differ in dialog management strategies in the way they represent and manipulate task knowledge and how much initiative they take in management of the user-computer spoken dialogue. For example, M. McTear discusses dialog management technology in M. McTear, "Spoken Dialogue Technology: Enabling the Conversational user Interface", *ACM Computing Surveys*, 2001, incorporated herein by reference.

In some systems, dialog grammars are used. Dialog grammars are constrained and well understood formalisms such a finite-state machines to express sequencing regularities in dialogs. As with most grammar systems, dialog-act types such as explain, complain, request, etc. are categories and the categories are used as terminals to the dialog grammar. Using dialog grammars enables the system at each stage of the spoken dialog to have a basis for setting expectations, which may correspond to activating statement-dependent language models. Further, using dialog grammars provides for setting thresholds for rejection and requests for clarification.

Figure 1:
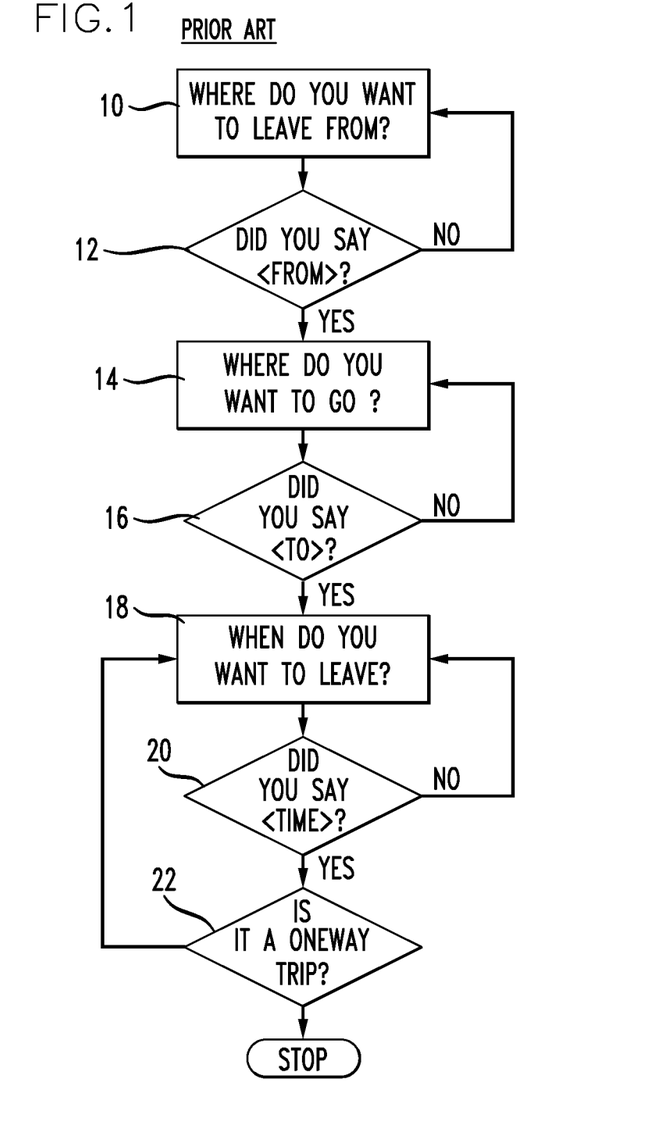
FIG. 1 illustrates the general architecture for a spoken dialog system.

FIG. 1 illustrates a finite state dialog grammar for an airline reservation system. In this example, the interactions are controlled based on bare information items. See Heeman, P. A., et al., "Beyond Structured Dialogues: Factoring Out Grounding," *Proc. Of the Int. Conf. on Spoken Language Processing*, 1998, Sydney, Australia. This interaction is a basic question and answer form and the topic queries are answered on-topic if possible, with the confirmation statement to find any problems. As shown in FIG. 1, the system asks "where do you want to leave from?" 10. After the user response, the system confirms by asking "Did you say <FROM>?" 12. If the answer is "no" from the user, the system returns and repeats the question 10. If the system's interpretation is correct, the system next asks "where do you want to go to?" 14. After the user's response, the system confirms by asking "did you say <TO>?" 16. If the system was incorrect, the question is asked again 14. If correct, the system proceeds to ask "when did you want to leave?" 18. After the user responds, the system confirms by asking "did you say <TIME>" 20. If the system was incorrect, it asks the question 18 again. If correct, the system proceeds to ask "is it a one-way stop?" and so on.

The above-mentioned finite state dialog manager provides some advantages in spoken dialog systems. Such a system is easily programmable but also increases the challenges of dealing with user deviations from the scripted dialog. For example, if a user provides too much information after the first question, such as name, time they want to leave, and come home, and where they want to go, the dialog management grammar in FIG. 1 cannot handle the information. In general, the dialog grammar approach has many disadvantages such as scripted and inflexible interaction as experienced by the user, difficulty with non-standard language such as irony, speech information may be provided by several utterances that can confuse the grammar, and as mentioned above, a speech utterance may include several pieces of information, which complicates the grammar.

Some more sophisticated approaches are being implemented to address the deficiencies of the dialog grammars. For example, enhancements to the hand-built finite state dialog grammars include adding statistical knowledge based on realistic data to the dialog grammars. Statistical learning methods, like CART, n-grams or neural networks can improve the understanding and associations between utterances and states the training data. See Andernach, T I, M. Poel, and E. Salomons, "Finding Classes of Dialogue Utterances with Kohonen Networks," *Proc. of the NLP Workshop of the European Conf. on Machine learning (ECML)*, 1997, Prague, Czech Republic. Finite-state based dialog managers lack the necessary scalability and maintainability demanded by customers today.

Another approach to dialog management is the plan-based approach. This concept seeks to overcome the weaknesses of the dialog grammar approach by taking advantage of the observation that humans plan their actions to achieve goals. The correspondence between plans and goals drives assumptions to infer goals and construct and activate plans. Therefore, the underlying concept for plan-based dialog managers is intelligent inference using the behavior of the user and the knowledge of the domain that are programmed into a set of logical rules. The system gathers facts from the user that trigger rules that generate more facts and the human-computer interaction progresses.

In terms of scalability, the plan-based approach is one embodiment of a state machine for which different discourse semantics are regarded as states. In plan-based systems, however, the states are generated dynamically and not limited to a predetermined finite set. This capability provides an improved level of scalability.

Figure 2:
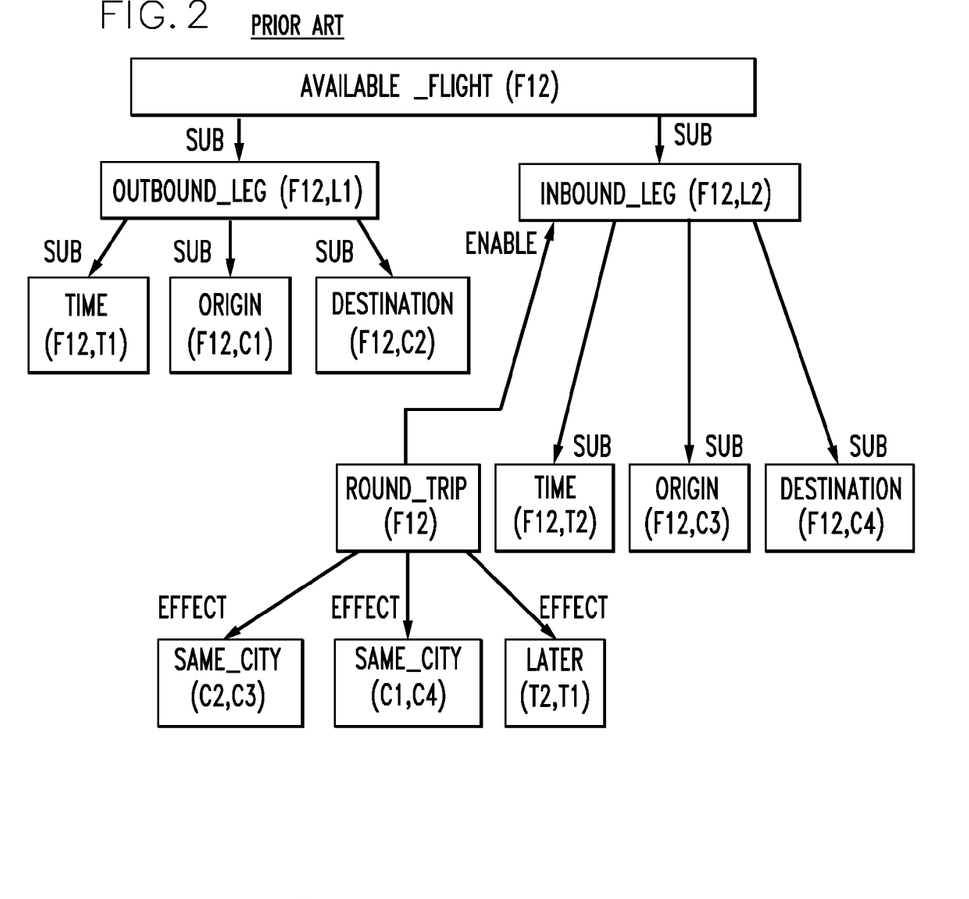

FIG. 2 illustrates a partial plan for an airline reservation system represented as a graph. See, Cohen, P. "Models of Dialogue," *Proc. of the Fourth NEC Research Symposium*, 1994, SIAM Press. The goal of this dialog manager is to derive an action based on a discourse semantic Sn. The output of the dialog manager is a message the system provides to the user. In FIG. 2, the person desires to know if the flight itinerary F12 is an available flight plan. The relationships among the goals and actions that compose the plan are represented as a directed graph, with goals, preconditions, actions and affects as nodes and relationships among these as arcs. FIG. 2 illustrates the compositional nature of the plan-based approach, which always includes nested subplans that can continue to an almost infinite sublevel.

The arcs in FIG. 2 are labeled with the relationship that holds between the two nodes. The "SUB" shows that the child arc is the beginning of a subplan for the parent. At some point appropriate to the domain of the planning application, the SUBs are suspended and represented as a single subsuming node. The term "ENABLE" indicates a precondition on a goal of action or indicates an enabling relationship between parent and child nodes. The "EFFECT" label indicates the result of an action.

The plan-based approach operates on a well-defined cycle, as illustrated below in a set of actions describing interaction between an agent and a client: (1) observe client's acts; (2) infer client's plan using the agent's model of the clients beliefs and goals; (3) debug the client's plan, finding obstacles to the success of the plan, based on the agent's beliefs; (4) adopt the negation of the obstacles as the agent's goal; and (5) plan to achieve those goals and execute the plan.

Returning to FIG. 2, a flight itinerary that at least contains an Outbound_Leg and another possible Inbound_Leg subgoal is a round trip. Assuming that F12 is a round trip itinerary, at the Inbound_Leg node, the system attempts to infer the underlying goal (Time(F12, T2), Original (F12,C3) and Dest (F12,C4)) by the information received from the dialog or from other known conditions. For example, the destination of the Inbound_Leg may be inferred from the origin of the outbound leg. Inferences are shown in the EFFECT arcs in FIG. 2.

The technologies requires to accomplish these inferences are complex models of beliefs, desires, and intentions of agent and they use generic logical systems which operate over the propositions corresponding to the nodes of a plan structure as shown in FIG. 2.

These plan based approaches permit a more flexible mode of interaction than do dialog grammars but they are nevertheless complex to construct and operate in practice. Therefore, since the complexity of modeling plan-based approaches requires significant human expert time to author the logical rules and axioms, this approach prevents many enterprises from being able to afford and incorporate spoken dialog systems into their business.

SUMMARY OF THE INVENTION

What is needed in the art is a system and method of providing a general dialog principle that is simple in its formulation and easy to implement as part of a dialog manager's library of dialog motivators. The present invention addresses the deficiencies in the prior art by providing a set of dialog motivators that are associated with the dialog manager of a spoken dialog system. The dialog motivators are not programmed into a set of rules for each new knowledge domain. They are generic across domains and capture inherent conversational patterns.

The present invention combines task knowledge and general dialog principles to arrive at a plurality of dialog motivators within a dialog manager to govern the computer interaction in a spoken dialog. Some of the available dialog motivators include an error handling motivator, a disambiguation dialog motivator, an assumption motivator, a confirmation motivator, a missing information motivator, and a continuation motivator. Other motivators may of course be used. This particular collection of dialog motivators covers basic interactions in a spoken dialog.

The input to the dialog manager comprises a collection of semantic information generated by the spoken language understanding unit (SLU) with associated confidence scores. The semantic information is in the form of a list of call types and confidence scores. The dialog manager parses this information and translates it into a construct. The dialog manager uses the construct to select and execute the appropriate dialog motivators from the plurality of dialog motivators. In one embodiment of the invention, the plurality of motivators includes an assumption dialog motivator and a confirmation dialog motivator that work to confirm user input in an efficient manner.

The dialog manager having a plurality of dialog motivators will receive information from the SLU generated from user speech input. The dialog manager cycle through each dialog motivator in the plurality of dialog motivators to determine and select the appropriate dialog motivators for handling a comment or question to the user in response to the user speech input.

Embodiments of the invention comprise a system, a method and a computer-readable medium associated with using a plurality of dialog motivators within a dialog manager to manage human computer spoken dialogs.

BRIEF DESCRIPTION OF THE DRAWINGS

The foregoing advantages of the present invention will be apparent from the following detailed description of several embodiments of the invention with reference to the corresponding accompanying drawings, in which:

FIG. 2 illustrates

DETAILED DESCRIPTION OF THE INVENTION

The present invention may be described with reference to several embodiments. The use of general dialog principles according to the present invention provides numerous improvements over the prior art. Both the plan-based approach and the FSM-based approach require rebuilding the rules because the domain knowledge is interlaced with the rules regarding what action to perform. One advantage of the present invention is that the dialog manager separates the domain knowledge from the rules thus allowing the dialog motivators to be re-used. In this regard, there is no need to re-implement the dialog motivators. They exist as a library that can simply be called if needed. There may be applications that do not require the assumption motivator, for example, in which case that motivator need not be included as part of the application. The application engineer simply chooses which motivators to use, but does not have to worry about implementing the rules, since these have already been implemented once and for all.

The FSM approach makes it virtually impossible to perform context switching, which would require too many defined nodes and transitions. The dialog manager of this invention can perform context switching because of the way it manipulates the constructs through the construct algebra, disclosed below. The various operators of the construct algebra allow the combination of new knowledge to be easily added to the existing knowledge and unnecessary knowledge to be eliminated. Similarly, the FSM approach does not easily facilitate the ability to absorb several pieces of information at a time, for the same reasons it cannot easily perform context switching.

Figure 3:
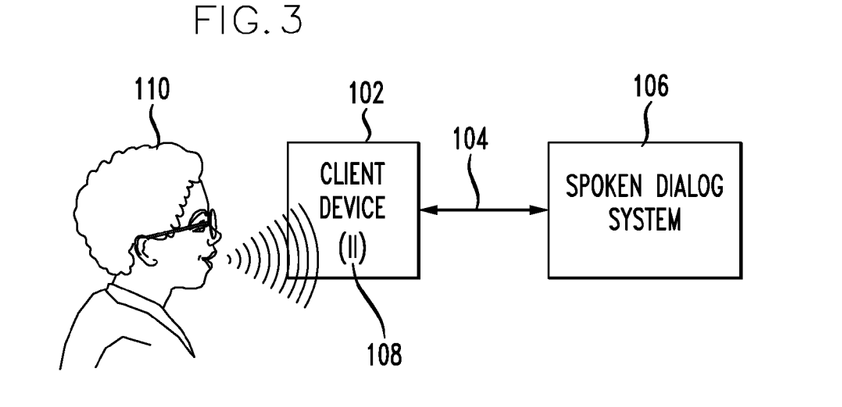
FIG. 3 illustrates the general architecture for a spoken dialog system.

The first embodiment is a spoken dialog system, the general architecture of which is illustrated in FIG. 3. In a network embodiment of the system, as shown in FIG. 3, a client device 102 communicates with a spoken dialog system 106 via a network 104. The network may be a telephone network, the Internet, a local area network, a wireless network or a satellite communications network. The specific kind of network is not relevant to the present invention except that in a network configuration, a client device will communicate with a spoken dialog system in order to carry on the spoken dialog.

The client device 102 includes known means, such as a microphone 108 and other processing technology (not shown), for receiving and processing the voice of a user 110. The client device 102 may be a telephone, cellphone, desktop computer, handheld computer device, satellite communication device, or any other device that can be used to receive user voice input.

The client device 102 will process the speech signals and transmit them over the network 104 to the spoken dialog system 106. The spoken dialog system may be a computer server, such as a IBM compatible computer having a Pentium 4 processor or a Linux-based system, and operate on any known operating system for running the spoken dialog program software.

The particular sharing of processing power between the client device 102 and the spoken dialog system 106 is unimportant to the present invention. Accordingly, the various modules ASR, SLU, DM, and TTS used for carrying on the dialog may be processed on either or both nodes (102, 106) in the network. For the sake of this disclosure, the spoken dialog system 106 will be considered as a computer server that receives coded voice input from the client device. The voice input is typically converted to text as part of the spoken dialog exchange since the DM typically receives text. The system 106 processes the speech input according to the principles of the invention, and returns synthetic speech to the client device for the user to hear. Although the invention is mainly discussed in the context of the standard spoken dialog system, it is understood that the DM can interact with a backend device as well, such as a database or a GUI display. In this regard, the input to the DM is not "user input" but text or other input from a database or other input stream wherein the use of dialog motivators can further control the dialog process or the system interaction with the database or other input means. Accordingly, the term "system" as used herein may refer to a spoken dialog system, a computer server processing a step according to the present invention, or any one of a variety of configurations associated with the operation of the DM.

While the various modules (ASR, SLU, DM and TTS) each perform a function within a spoken dialog experience, the present invention relates primarily to the tasks of the DM. The present invention provides a framework for describing the dialog process. The framework that may be termed a construct algebra. For more information on construct algebras, see, A. Abella and A. Gorin, "Construct Algebra: Analytical Dialog Management", *Proc. ACL*, Washington D.C., June 1999, incorporated herein by reference. The construct algebra is used to model the dialog process by providing the required building blocks that characterize the relationships and operations of the algebra. One result of this approach is a plurality of reusable dialog motivators associated with the dialog manager. A dialog motivator determines what action the dialog manager needs to take in conducting its dialog with a user. A dialog motivator is a software module that is the embodiment of general dialog principles—such the general principle of "missing information" means that in the course of the dialog, information is missing. The system implements the dialog motivators are rules that act on instances of task knowledge during the spoken dialog.

In addition to the dialog motivators, the dialog manager uses a task knowledge representation based on the object-oriented paradigm, as taught in A. Abella and A. Gorin, "Generating Semantically Consistent Inputs to a Dialog Manager", *Eurospeech*, Rhodes, September 1997, incorporated herein by reference.

These objects form an inheritance hierarchy that defines the relationships that exists among these objects. The dialog manager exploits task knowledge and the dialog motivators to govern what action to perform. A dialog manager operating according to the principles of the invention can be used in applications using features such as the open-ended prompt: "How may I help you?" Other applications include operator services, handling customer orders and complaints and for collect call services.

In these applications, a customer could ask to make a collect call, get credit for a wrong number, ask for the time somewhere, etc. Another application for the present invention is for a voice directory service, such as the one discussed in B. Buntchuh, C. Kamm, D. DiFrabbrizio, A. Abella, M. Mohri, S. Narayanan, I. Zeljkovic, R. Sharp, J. Wright, S. Marcus, J. Shaffer, R. Duncan, and J. Wilpon, "VPQ: A Spoken language interface to large scale directory information", *Proc. ICSLP*, Sydney, November 1998, incorporated herein by reference. The voice directory application provides spoken access to information in a large personnel database (>120,000 entries). A user could ask for employee information such as phone number, fax number, work location, or ask to call an employee.

Another application for the principles of the present invention is AT&T's customer care service. This application handles queries about a customer's phone bill. Customers may request to have charges explained to them, to have calling plans described, request their account balance etc. These applications as well as many others illustrate the contexts in which the present invention may be utilized.

This disclosure follows the process of developing a general dialog principle from its conception, as simply an abstract idea, to its formulation where the concept becomes something that can easily be implemented and utilized as part of the dialog manager's library of dialog motivators. A dialog principle models a recurring conversational pattern, such as confirmation of user input or making assumptions regarding user input. These conversational patterns are modeled analytically using the construct algebra introduced above and result in the creation of reusable dialog motivators. Throughout this disclosure, the application used for discussing the principles of the invention will be the dialog manager used by AT&T's "How May I Help You?"$^{SM}$ spoken dialog system.

A dialog motivator is the embodiment of general dialog principles. A finite and relatively small number of general dialog principles exist that model conversational patterns. Six dialog motivators will be introduced herein, although others may also be used in the dialog manager. The dialog manager includes a plurality of dialog motivators comprising an error handling dialog motivator, a clarification or disambiguation dialog motivator, an assumption dialog motivator, a confirmation dialog motivator, a missing information dialog motivator, and a continuation dialog motivator.

During the spoken dialog between a user and the spoken dialog system, the dialog manager cycles sequentially through each of these motivators until one applies.

Since the dialog motivators are associated with the dialog manager, in a spoken language dialog, several components exist between the actual voice of the user and the dialog manager. The ASR and then the SLU process the speech sounds. The input to the dialog manager may be a collection of semantic information generated by the SLU, along with associated confidence scores. For example, consider the following spoken dialog with SLU output:

System: AT&T, how may I help you?
User: I have a question about my bill.
SLU: General_Billing 0.9 Billing_Services 0.9
System: Okay what is your question?
User: I want to enroll in the seven cents a minute plan
SLU: Rate_Calling_Plans 0.85

Here, the terms General_Billing, Billing_Services, and Rate_Calling_Plans are example of call types. The DM parses this result and translates them into its own internal knowledge representation—the construct introduced above. The construct algebra consists of a set of relations and relations that act on the constructs. The constructs are themselves the knowledge representation.

Once the DM parses the input, it creates the internal representation and the dialog manager determines and selects the appropriate dialog motivator from a plurality of dialog motivators.

Table 1 provides an illustration of terms and notation that are used in association with this disclosure

TABLE 1

| | |
|---|---|
| Rep | Internal DM construct that represents conjunction of constructs |
| Key | Internal DM construct used by assumption to encode (key, value) pairs |
| Val | Internal DM construct used by assumption to encode (key, value) pairs |
| Main | Base class for all application-specific constructs |
| $C_C$ | Construct that represents the current knowledge |
| $C_I$ | Construct that represents the input knowledge |
| $C_0$ | Construct whose value has been set to NULL |
| $C_T$ | Template construct created by confirmation and used by assumption. The structure is $C_T = \text{Rep} \diamond \text{Key} \diamond (C_C, \text{Val} \diamond \text{Key} \diamond (C_0, \text{Val} \diamond C_I))$ |

The symbol $\diamond$ represents a "has-a" relation from the object-oriented paradigm. The following provides a general pseudo-code description of the DM algorithm:

```
Repeat
   For all dialog motivators DM_i
      If DM_i applies to c
      Perform action(DM_i,c)
      Apply Dialog Manager to get c_i
      If c is not compatible with c_i
         Set c = c_i and use construct algebra to retain in c that information
         that is compatible with c_i (perform a context switch)
      else
         Using the Construct Algebra combine c and c_i into c
Until no motivator applies
Return c and perform final action
```

In the above pseudo-code, $DM_i$ represents the set of i dialog motivators, c represents the user speech input, and $c_i$ represents a response generated using the i-th dialog motivator.

The dialog manager cycles through the plurality of dialog motivators in an orderly manner. Preferably, the order of motivators is as follows: 1. Error Handling, 2. Disambiguation, 3. Assumption, 4. Confirmation, 5. Missing Information, and 6. Continuation. The order may differ depending on the application. As mentioned above, the present invention is not meant to be limited to these specific types of dialog motivators but these provide a representative example of the principles of the present invention.

Next, the disclosure discusses further details for each dialog motivator. The error handling dialog motivator may comprise other dialog sub-motivators for handling errors. For example, error recovery is needed when the speech recognizer has likely mis-recognized what the user has said, when the user is silent or when the user says something the SLU component does not expect or does not handle. Therefore, an error handling dialog motivator may have multiple components or comprise dialog sub-motivators for handling mis-recognitions, silence and unexpected user speech input. Other types of errors may also require specific dialog motivators.

The following provides examples of a spoken dialog using the error handling dialog motivator for a speech recognition error:

System: AT&T, how may I help you?
User: This is Felicia Stone.
System: I'm sorry, I didn't quite get that. Please tell me how may I help you?

In this example, the speech recognizer is not trained to recognize personal names, and returns a failure notification to the DM which the DM interprets as an error and causes the reprompt that will allow the user to rephrase their request.

The following provides an example spoken dialog for handling silence:

System: AT&T, how may I help you?
User: (silent)
System: I'm sorry, I didn't understand that. How may I help you?

In this example, the user does not respond. The system cycles through the plurality of dialog motivators until it selects the error handling dialog motivator to provide the appropriate system response. The error handling motivator determines that this is an error and reprompts appropriately.

Next, the following dialog illustrates the error handling dialog motivator where the SLU does not handle this type of request:

System: AT&T, how may I help you?
User: I would like a pepperoni pizza please
System: I'm sorry, I didn't get that. Please tell me how may I help you?

The dialog manager can specify how many errors can occur during a dialog before it determines that the call needs to be handled by a customer service representative. For the customer care system application, this value is set to 2. If the DM has seen more than 2 errors of the same type it will send the customer to a representative. For example, if the user is silent after two turns it will transfer the call to the customer service representative. However, the system could have seen two of the aforementioned errors and then correctly interpreted what the user wanted and continued with a subdialog that itself may encounter errors, but since the system is now in a different context it will reprompt again. For example, An error handling dialog motivator for multiple errors may result in the following dialog:

System: AT&T, how may I help you?
User: (silent)
System: I'm sorry, I didn't understand that. How may I help you?
User: This is Felicia Stone.
System: I'm sorry, I didn't quite get that. Please tell me how may I help you?
User: I have some numbers on my bill I don't recognize.
System: I can help you with that. Are you calling from your home phone?
User: (silent)
System: I'm sorry. Are you calling from you home phone?

In this example, although there were two silence errors—one was at the top level of the dialog and the other was at a subdialog level where the system was trying to determine if the user was calling from home, hence an error in this context is acceptable and the result is a reprompt.

The clarification dialog motivator determines when there is ambiguous semantic information. An example operator services dialog wherein the system selects the clarification dialog motivator follows:

System: AT&T, how may I help you?
User: I want to make a collect card call.
System: Would you like to make a collect call or a calling card call?
User: A calling card call.

In this example, the user specifies two potential means of billing a call and the DM needs to clarify which of the two the user intended.

The confirmation dialog motivator is used when the SLU returns a result with low confidence. For example:

System: AT&T, how may I help you?
User: I have some charges on some calls I didn't make I don't think.
System: Do you want to look up a number you don't recognize on your bill?
User: Yes.

In this example, the SLU informed the DM that it thought the user wants to look up a number they don't recognize on their bill but it's not certain. This information is contained in the call types and confidence scores transmitted to the DM. Therefore, the DM, after cycling through the plurality of dialog motivators, selects the confirmation dialog motivator and decides to confirm the user's intention before continuing with the dialog. The dialog manager has a threshold that it uses to determine whether or not to confirm a call type that is returned by the SLU.

The following steps describe the confirmation process for the dialog

Step 1. The DM creates:
$C_i$=Unrecognized_Number(0.65) ◊ Home_Phone (NULL)

Step 2. Confirmation is invoked because 0.65 is below the threshold.

Step 3. Based on the user's response the DM creates:
$C_i$=Unrecognized_Number(1.0) ◊ Home_Phone(NULL) since the user said "yes" the confidence score is 1.0.

The following dialog and process steps illustrate the missing information dialog motivator.

System: AT&T, how may I help you?
User: I lost my bill can I get another copy?
System: I can help you with that. Are you calling from your home phone?
User: No.
System: May I have your home phone number starting with the area code?
User: 555-1246

The following steps describe the process for Missing Information.

Step 1. The DM creates:
$C_i$=Duplicate_Bill ◊ Ambiguity ◊ Home_Phone(NULL) ◊ Ani(NULL)

Step 2. The disambiguation motivator applies and the DM creates:
$C_i$=Ani(0,NULL)
C=Duplicate_Bill ◊ Home_Phone(NULL)

Step 3. Missing Information is invoked because Home_Phone does not have a value.

Step 4. Based on the user's response the DM creates:
$C_i$=Home_Phone(555-1246)
C=Duplicate_Bill ◊ Home_Phone(555-1246)

In this example, the user has stated that they are not calling from their home phone so the system needs to prompt them for their home phone number. The home phone number is necessary to look up their account and be able to successfully complete their transaction. Asking for a person's "home phone number" may also refer to asking for any other reference for identification. For example, social security number, street number, or any other kind of identifying information. As used herein, the term "home phone number" can refer to any of these inquiries.

The assumption dialog may make assumptions based on a-priori information, or information obtained independently of the spoken dialog experience. The following spoken dialog illustrates the use of this dialog motivator:

System: AT&T, how may I help you?
User: I have a question about my bill.
System: Okay. What is your question?
User: I have some charges here that I don't understand.
System: May I have your home phone number please?
User: 555-1234
System: Please hold while I transfer your call.

In this example, the a-priori assumption is based on predetermined requirements defined in the call flow. Therefore, the requirement is to transfer the customer to the main menu of the interactive voice response (IVR) system if they cannot be classified as wanting a concrete call type after two attempts. A concrete call type results in transferring the customer to a subsystem of the IVR or to a customer service representative. A vague call type results in a transfer to the main menu of the IVR system. However, before the transfer it is necessary to ask the customer for their home phone number.

Another variation on the assumption dialog motivator is to use a-posteriori information, or information obtained through the current spoken dialog experience, to make assumptions about received information from the SLU. The following provides an example dialog using this version of the assumption dialog motivator:

System: What is your phone number?
User: 555-1235.
System: Was that 555-1235?
User: No.
System: I'm sorry, please say your home phone number again.
User: It is 555-1234.
System: Was that 555-1234?
User: Yes.

In this dialog the system is asking the user for their phone number and subsequently confirming that it understood the numbers correctly. At the point of confirmation the DM has created an assumption about what the phone number is, namely, 555-1235. The user's response to the confirmation question negates this assumption and leaves the DM without a phone number thus prompting the user for their phone number again. The second time the user confirms the new phone number the DM can store this new number as the user's phone number.

A missing information dialog motivator determines what information to ask about in order to complete a transaction. The continuation principle or dialog motivator determines when it is valid to offer the user the choice to query the system for additional information or requests. An example of the operation of the continuation dialog motivator follows:

System: AT&T, how may I help you?
User: What is this charge called a usage minimum
System: Some AT&T calling plans have a five dollar usage minimum charge. If you're on one of these plans and your monthly charge is less than five dollars, the difference is added to your bill. Would you like to hear more?
User: No.
System: Is there anything else I can help you with today?
User: Yes.
System: What can I do for you?

In this example, the system correctly describes what the charge in question is and offers the user to ability to ask for another request by prompting "Is there anything else I can help you with today?". Knowing when to ask this question is the responsibility of the continuation motivator. Another question from the continuation motivator may be: "would you like to look up another number you don't recognize on your bill?" An answer of "yes" or "no" triggers certain algorithms for manipulating the current knowledge the dialog manager has about the dialog.

The following is another dialog will be used to illustrate the steps taken by the continuation dialog motivator.

System: AT&T, how may I help you?
User: I'd like to find out about online billing.
System: AT&T now offers the option of receiving your AT&T bill online . . . . Is there anything else I can help you with today?
User: No.
System. Thank you for using AT&T. Goodbye.

The following steps describe the continuation process for the continuation dialog motivator.

Step 1. The DM creates:
$C_i$=On_Line_Bill ◇ Continuation(NULL)
Step 2. Based on the user's response the DM creates:
$C_i$=Continuation(0)
C=On_Line_Bill No more motivators apply and the final action is executed which is to say "goodbye".

Each of the aforementioned dialog motivators has come into existence because of a need to model a conversational pattern that is required to successfully implement a dialog flow for an application. The missing information dialog motivator, for example, was created initially for operator services because the system needed to collect the customer's phone number and method of payment in order to complete a call. This motivator is reused for the customer care service. The continuation dialog motivator came into existence during the implementation of the AT&T voice directory application. In this application it was typical to have more than one request per call so this led to the continuation motivator that was also reused for customer care. The assumption motivator came into existence because of a conversational pattern that was not being modeled and was identified as recurrent. This motivator will be described in detail below.

Each of these dialog motivators acts on a data structure called a construct. A construct is the dialog manager's general knowledge representation vehicle. The construct itself is represented as a tree structure that allows for the building of a containment hierarchy. It typically consists of a head and a body. FIG. XX illustrates the construct example for AT&T's How May I Help You? (HMIHY service. [FIG. 1 from the Construct Algebra paper] The DIAL_FOR_ME construct is the head and it has two constructs for the body, FORWARD_NUMBER and BILLING. These two constructs illustrate the two pieces of information necessary to complete the call. The construct algebra represents and defines a collection of elementary relationship and operations on a set of constructs. These relations and operations are then used to build the larger processing units that are called the dialog motivators.

Figure 4:
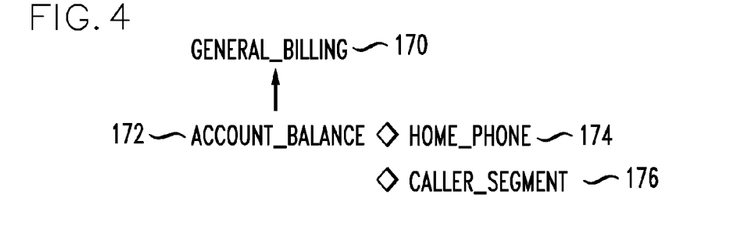
FIG. 4 illustrates a construct for a customer care services application.

Knowledge about the task is encoded using the construct or an object inheritance hierarchy. The hierarchy defines the relationships that exist among the task knowledge components. It is encoded as a hierarchy of constructs and is represented as a tree structure that allows for the building of a containment hierarchy. FIG. 4 illustrates an example of a construct taken from the customer care services application.

The construct illustrated in FIG. 4 represents the fact that Account_Balance 172 "is-a" General_Billing 170 and "has-a" Home_Phone 174 and a Caller_Segment 176. Home_Phone 274 is the number of the bill in question and Caller_Segment 176 represents how much they spend on long distance a month.

The construct algebra defines a collection of elementary operations and relations on the set of constructs. As an example, there may be six relations and four operations. These relations and operations are then used to build the larger processing units that are the dialog motivators. The set of dialog motivators together with the task knowledge defines the application. This disclosure describes two of the operations that are used by the assumption principle: the projection and insertion operations. The formal definition will be known to those of skill in the art and thus omitted in favor of an illustrative description.

Figure 5:
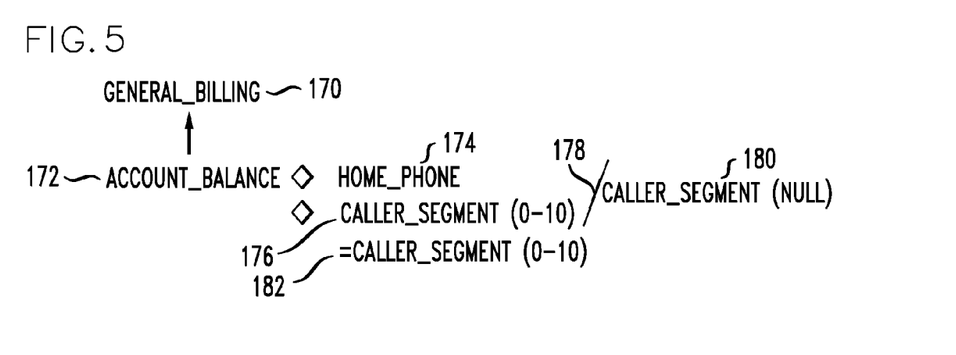
FIG. 5 illustrates an example projection operator.

FIG. 5 illustrates an example of a projection operator "/". The construct is similar to that shown in FIG. 4 with the addition of the projection operator "/" 178 and Caller_Segment (NULL) 180. The result of the projection operator "/" for this example is the Caller_Segment 182 whose value is the string 0-10 because the right operand is contained in the left operand and the value is NULL, which makes it compatible with the Caller_Segment in the left operand.

Figure 6:
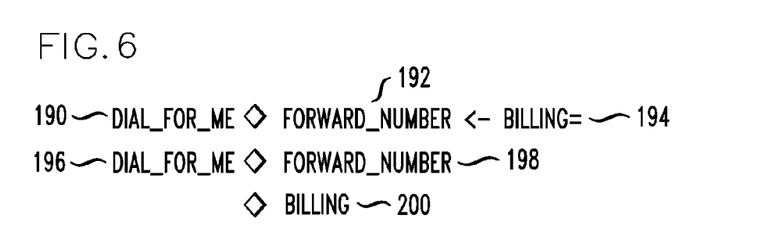
FIG. 6 illustrates an insertion operator.

The insertion operator "←" simply inserts a new construct to an existing construct as long as that construct is not already present. FIG. 6 illustrates the operation of the insertion operator into a Dial_For_Me "is-a" construct 190 with a "has-a" construct of Forward_Number construct 192 having a Billing construct inserted in. The result is the "is-a" Dial_For_Me construct 196 having an "has-a" Forward_Number 198 and "has-a" Billing construct 200 following.

The first step in the creation of a dialog motivator is the identification of a reusable and recurring conversational pattern. The discussion explains the creation of the assumption motivator beginning with the motivation for its creation.

The goal of all the dialog motivators is to augment and/or modify the DM's body of knowledge in order to fulfill the user's request. The assumption motivator is no different. The assumption motivator enables the DM to either retain or discard information that it has collected through the course of a dialog. In order to accomplish this, the assumption motivator works in conjunction with the confirmation motivator. Whenever the system invokes the confirmation motivator, the assumption motivator determines whether or not the answer to the confirmation question reinforces or negates the value that is being confirmed.

The assumption motivator can be viewed as an inference engine. That is, given a set of a-priori knowledge and currently acquired knowledge, the assumption motivator can assume something about the current state of the dialog (a-priori assumption). Likewise the assumption motivator can also work on knowledge that it has been acquiring during the course of an interaction with a user and the most recently acquired knowledge to assume something about the current state of the dialog (a-posteriori assumption).

Figure 7:
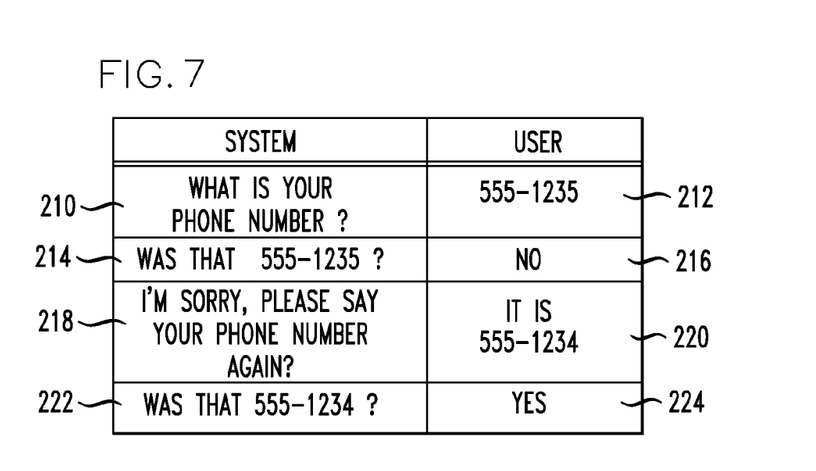
FIG. 7 illustrates an example dialog using a-posteriori assumption.

FIG. 7 illustrates an example of a dialog scenario that led to the identification of the assumption motivator. In this dialog the system asks the user 210 for their phone number. The user responds by saying "555-1235" 212. Subsequently, the system confirms that it understood the numbers correctly by asking "Was that 555-1235?" 214. At the point of confirmation, the DM has created an assumption about what the phone number is, namely, 555-1235. The user's response 216 to the confirmation question negates this assumption and leaves the DM without a phone number thus prompting the user for their phone number again 218. The second time the user confirms the new phone number 220 the DM can store this new number as the user's phone number. Another confirmation question 222 from the system can confirm that it has the correct number with an affirmative response 224 from the user.

Figure 8:
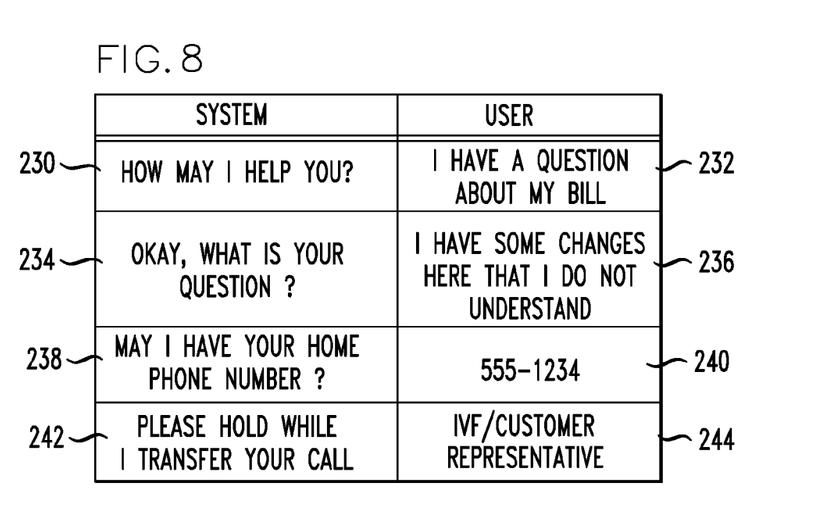
FIG. 8 illustrates an example dialog using a-priori assumption.

The aforementioned example illustrated an a-posteriori assumption. The following example, as shown in FIG. 8, illustrates the a-priori assumption. The a-priori assumption is based on the requirement defined in the call flow. In this example, the requirement is to transfer a customer to the main menu of an IVR system if they cannot be classified as wanting a concrete call type after two attempts. A concrete call type results in transferring the customer to a subsystem of the IVR or to a customer service representative. A vague call type results in a transfer to the main menu of the IVR system. However, before the transfer it is necessary to ask the customer for their home phone number.

As shown in FIG. 8, the system asks "how may I help you?" 230. The person responds "I have a question about my bill" 232. The system says "Okay, what is your question?" 234. In response, the user states: "I have some charges here that I don't understand" 236. The system then responds, "May I have your home phone number?" 238 and after the user provides the phone number 240, the system notifies the user that the call will be transferred 242 to an IVR service 244.

The assumption if made during the process shown in FIG. 8. For example, after receiving the user's response of "I have some charges here that I don't understand," the DM has observed two vague call types and hence finds a match against the template construct that tells the DM what assumption to make because it found a compatible construct to the template construct. The assumption is to ask for the home_number.

The next section will describe in more detail the process that is invoked as a result the creation of an assumption.

The assumption motivator is implemented as a mapping from two constructs to a new construct. The two constructs represent the current knowledge that the DM has been acquiring ($C_C$) and the input knowledge that represents the most recently acquired piece of knowledge ($C_I$). The assumption motivator uses a template construct ($C_T$) to encode this mapping and it does so as a collection of (key, value) pairs. It is important to note that $C_T$ is a doubly indexed lookup table. $C_T$ is indexed by $C_C$ and $C_I$. $C_T$ is implemented as a doubly indexed lookup table because two arguments are required to retrieve a result, namely $C_C$ and $C_I$. A construct is used to encode the lookup table because the construct algebra already provides the necessary operations to manipulate the constructs.

The following steps describe the assumption process for a caller's inquiry with regards to an unrecognized number on their bill as illustrated in FIG. 7.

Step 1 The DM creates
$C_C$=Unrecognized_Number ◊ Home_Phone(NULL)
$C_I$=Unrecognized_Number ◊ Home_Phone(NULL)
$C_T$=NULL Step 2 The Missing information principle or module is invoked to collect the caller's home phone number since its value is NULL.

Step 3 Based on the caller's response, the DM creates:
$C_C$=Unrecognized_Number ◊ Home_Phone(555-1235)
$C_I$=Home_Phone(555-1235)

Step 4 The confirmation principle is invoked because Home_Phone has a low confidence. The DM creates:

---

$C_C$ = Unrecognized_Number ◊ Home_Phone(NULL)
$C_0$ = Home_Phone(NULL)
$C_T$ = Rep ◊
Key ◊
(Unrecognized_Number,
Val ◊
Key ◊
(Home_Phone=NULL,
Val ◊
Home_Phone=555-1235))
(The value of Home_Phone for $C_C$ is erased and maintained in $C_T$ for possible retrieval.)

---

Step 5 After the caller responds "No" to the prompt "Was that 555-1235?" the DM creates:
$C_C$=Unrecognized_Number ◊ Home_Phone(NULL)
$C_I$=Home_Phone(NULL)

The assumption motivator does not get invoked because the value for Home_Phone that the system initially thought might be correct is negated by the caller's response. Since Home_Phone is empty in $C_C$ missing information is invoked again to reprompt for the missing number.

Step 6 After the caller gives a new number, the DM creates:
$C_C$=Unrecognized_Number ◊ Home_Phone(555-1234)
$C_I$=Home_Phone(555-1234)

Step 7 The confirmation principle is invoked because Home_Phone again has a low enough confidence. The DM creates:

---

$C_C$ = Unrecognized_Number ◊ Home_Phone(NULL)
$C_0$ = Home_Phone(NULL)
$C_T$ = Rep ◊
Key ◊

-continued

```
(Unrecognized_Number,
Val ◊
Key ◊
    (Home_Phone=NULL,
    Val ◊
        Home_Phone=555-1234))
```

The system replaces the value for Home_Phone in $C_T$ with the new value from $C_I$ since the previous assumption had been negated.

Step 8 After a "Yes" response to the confirmation question, the assumption motivator is invoked and the DM creates:
$C_C$=Unrecognized_Number ◊ Home_Phone(555-1234)
$C_I$=Home_Phone The assumption motivator does this by indexing $C_T$ with Unrecognized_Number, which is still the current context returned by the SLU, and $C_I$ that is also returned by the SLU without a value but with high confidence, since the user's response was "Yes" in the context of confirming the value of the phone number. Because an entry is found in $C_T$ that can be indexed by $C_C$ and $C_I$, the value is added to $C_C$ namely 555-1234.

Figure 9:
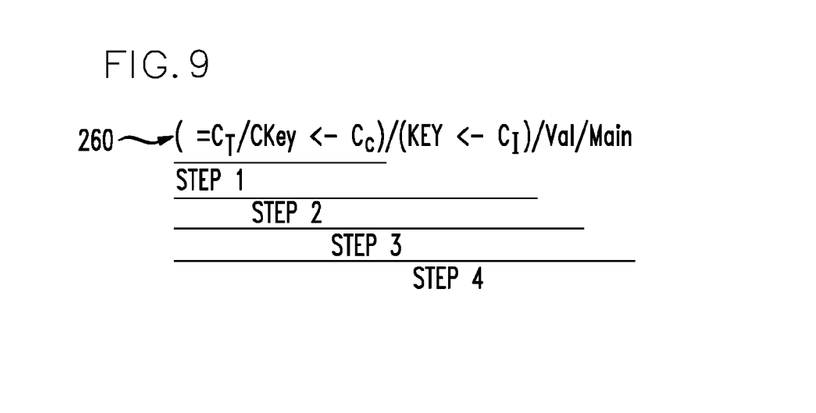
FIG. 9 illustrates a formula for implementing an assumption dialog motivator.

Once the abstract idea has been identified, the task of formulation follows to use the construct algebra to build the motivator. FIG. 9 illustrates a formula 260 that implements the assumption motivator. Below the formula 260 are steps indicating how the process of formula 260 can be analyzed.

Step 1 extracts the Key portion from $C_T$ to reveal:
```
Key ◊ (
Unrecognized_Number,
Val ◊
Key ◊ (
Home_Phone(NULL),
Val ◊
    Home_Phone(555-1234))).
```

Step 2 extracts the second Key from $C_T$ to reveal:
Key ◊ (Home_Phone(NULL),
Val ◊ Home_Phone(555-1234)).

Step 3 extracts the Val portion that contains the value of the phone number Val ◊ Home_Phone(555-1234).

In Step 4, it is necessary to apply the projection operation to extract Home_Phone since it is application specific and inherits from Main. This reveals Home_Phone(555-1234) that gets merged with $C_C$ to produce the updated knowledge for the DM.

The above describes the detailed steps exercised by the assumption motivator on the a-posteriori example. The a-priori example is similar with the exception that $C_T$ is created beforehand as part of the DM's body of knowledge. Note that $C_T$ may contain several assumptions. The fundamental functionality of the a-priori assumption is the same, that of regulating knowledge within a dialog.

This disclosure describes an exemplary process of developing a new general dialog principle from its infancy, as an abstract idea, to its formulation using the construct algebra. The assumption motivator was born out of the need to model a conversational pattern that would enable the reinforcement or negation of beliefs that were acquired by the DM during the course of a dialog (a-posteriori assumption) or encoded beforehand as part of the DM's initial knowledge about the application (a-priori assumption). The assumption motivator is another example of the effectiveness of the construct algebra as a framework for modeling the dialog process.

The following dialog provides an example of the error handling process performed by the error handling dialog motivator for a dialog. System:
AT&T, how may I help you?
User: (silent)
System: I'm sorry, I didn't understand that. How may I help you?
User: This is Felicia Stone.
System: I'm sorry, I didn't quite get that. Please tell me how may I help you?
User: I have some numbers on my bill I don't recognize.
System: I can help you with that. Are you calling from your home phone?

The following steps describe the error handling process for the dialog. The ◊ symbol represents the "has-a" relation from the object-oriented paradigm. E.g. Unrecognized_Number "has-a" Home_Phone.

Step 1. The DM creates
$C_i$=No_Caller_Speech

Step 2. Error Handling is invoked because No_Caller_Speech "is-a" kind of error. (In other words, the No_Caller_Speech class inherits from the Error Class. See, e.g., A. Abella and A. Gorin, "Generating Semantically Consistent Inputs to a Dialog Manager", *Eurospeech*, Rhodes, Greece, 1997. The action is to play the next system prompt.)

Step 3. Based on the user's response the DM creates:
$C_i$=No_Information

Step 4. Once again Error Handling is invoked this time on No_Information since this too "is-a" kind of error. The action is to play the next system prompt.

Step 5. Based on the user's response the DM creates:
$C_i$=Unrecognized_Number ◊ Home_Phone(NULL)
$C=C_i$ since No_Information and Unrecognized_Number are not compatible Step 6. Disambiguation motivator is invoked to determine if the user is calling from home or not. The disambiguation motivator comes in two types. The first type is the kind of clarification that is described in the example below and then the second type is the kind of clarification that is required in a VPQ-like application. The difference is that in the VPQ application the ambiguity exists because of difference in the values of constructs and not the base construct itself. For example, after performing a database query to look for the office number of a John Smith we may receive five constructs of type Person whose Names are the same, where Name is in a has-a relation with Person, but whose Work_location differ, in which case we would clarify by asking the user a question about the person's work location. The example below includes a need for a clarification between two different constructs, namely Home_Number and Ani. Whereas the aforementioned example all have the same construct, namely, Person but the value of some of its members differs and hence there is an ambiguity among multiple constructs of the same type.

In this regard, the invention relates to receiving user input and then querying a database. The information obtained from the database may involve an ambiguity such that further information is needed to provide the user with the appropriate answer. Dialog motivators can be used to further interact with the user to clarify or provide further information, whether it be to confirm, disambiguate, etc. in order to revise the database query and present the appropriate database information to the user.

An example of the first type disambiguation dialog motivator follows:

System: AT&T, how may I help you?
User: I need to check how much I owe this month.
System: I can help you with that. Are you calling from your home phone?
User: Yes.
System: Please hold while I transfer your call to the billing system.

The following steps further describe the disambiguation process.

Step 1. The DM creates
$C_i$=Account_Balance ◊ Ambiguity ◊ Home_Phone (NULL)
◊ Ani(NULL)

Step 2. Disambiguation is invoked because it detects the presence of an ambiguity class as a member of Account_Balance.

Step 3. Based on the user's response the DM creates
$C_i$=Ani(1.0)
C=Account_Balance ◊ Ani(1.0,555-1235)

Step 4. No further motivators apply and the final action of transferring the call is executed. The phone number associated with the Ani is sent to the DM when the call gets initiated. The DM puts it aside until it needs it. The ambiguity class is a base class for the DM and is used to represent ambiguities.

Having introduced and discussed the various dialog motivators that can control the dialog flow in a spoken dialog system, the following is an example dialog from an operator services application (AT&T) indicating a sample of the motivators used at each step of the dialog with a user:

AT&T. How may I help you?
User: 3292 6043
AT&T: Sorry. Please enter or say the area code and number again. (Error Handling dialog motivator)
User: 329 2403
AT&T: Would you like to bill this to the phone that you're calling from now?(Missing Information dialog motivator)
User: No
AT&T: How would you like to bill this call? (Missing Information dialog motivator)
User: Call credit card
AT&T: Do you want to make a card call? (Confirmation dialog motivator)
User: Yes
AT&T: May I have your card number please? (Missing Information dialog motivator)
User: 1234 5678 9012 3456
AT&T: Thank you.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

We claim:

1. A system comprising:
  a processor; and
  a computer-readable storage device having instructions stored which, when executed by the processor, cause the processor to perform operations comprising:
    selecting a task-specific dialog motivator from a plurality of non-domain specific dialog motivators, wherein:
      the plurality of non-domain specific dialog motivators are not associated with any domain;
      each non-domain specific dialog motivator in the plurality of non-domain specific dialog motivators determines what action a dialog manager needs to take in conducting a dialog with a user using rules that act on instances of task knowledge;
      the plurality of non-domain specific dialog motivators comprise an assumption dialog motivator and a confirmation dialog motivator; and
      the task-specific dialog motivator is selected based on a comparison of user input to characteristics of each non-domain specific dialog motivator in the plurality of non-domain specific dialog motivators; and
    upon a spoken dialog system requesting further user input and invoking the confirmation dialog motivator to confirm the further user input:
      receiving the further user input; and
      when a confidence value associated with understanding the further user input is below a threshold value, invoking the assumption dialog motivator to present assumed further user input during a confirmation dialog.

2. The system of claim 1, wherein the plurality of non-domain specific dialog motivators further comprises a previously encoded assumption dialog motivator.

3. The system of claim 1, wherein the plurality of non-domain specific dialog motivators further comprises an acquired information assumption dialog motivator.

4. The system of claim 2, wherein the previously encoded assumption dialog motivator is governed by predefined rules governing call flow.

5. The system of claim 4, wherein an previously encoded assumption by the previously encoded assumption dialog motivator triggers a transfer of the user to a main menu of an interactive voice response system when the user is not classified as wanting a concrete call type.

6. The system of claim 4, wherein a previously encoded assumption by the previously encoded assumption dialog motivator triggers transferring the user to a customer service representative when the user is not classified as wanting a concrete call type.

7. The system of claim 4, wherein a previously encoded assumption by the previously encoded assumption dialog motivator triggers transferring the user to an interactive voice response system when the call type is classified as a vague call.

8. The system of claim 5, wherein before the spoken dialog service transfers the user to the main menu, the spoken dialog service requests the user's telephone number.

9. The system of claim 6, the computer-readable storage device having additional instructions stored which result in the operations further comprising, before transferring the user to the customer service representative, requesting a telephone number from the user.

10. The system of claim 7, the computer-readable storage device having additional instructions stored which result in the operations further comprising, before transferring the user to the interactive voice response system, requesting a telephone number from the user.

11. The system of claim 1, wherein the spoken dialog system further comprises a dialog manager.

12. A method comprising:
  selecting, using a processor, a task-specific dialog motivator from a plurality of non-domain specific dialog motivators, wherein:
    the plurality of non-domain specific dialog motivators are not associated with any domain;
    each non-domain specific dialog motivator in the plurality of non-domain specific dialog motivators determines what action a dialog manager needs to take in conducting a dialog with a user using rules that act on instances of task knowledge;

the plurality of non-domain specific dialog motivators comprise an assumption dialog motivator and a confirmation dialog motivator; and the task-specific dialog motivator is selected based on a comparison of user input to characteristics of each non-domain specific dialog motivator in the plurality of non-domain specific dialog motivators; and upon a spoken dialog system requesting further user input and invoking the confirmation dialog motivator to confirm the further user input:

receiving the further user input; and when a confidence value associated with understanding the further user input is below a threshold value, invoking the assumption dialog motivator to present assumed further user input during a confirmation dialog.

13. The method of claim 12, wherein the plurality of non-domain specific dialog motivators further comprise a previously encoded assumption dialog motivator.

14. The method of claim 12, wherein the plurality of non-domain specific dialog motivators further comprise an acquired information assumption dialog motivator.

15. The method of claim 13, wherein the previously encoded assumption dialog motivator is governed by predefined rules governing call flow.

16. The method of claim 15, wherein a previously encoded assumption by the previously encoded assumption dialog motivator triggers a transfer of the user to a main menu of an interactive voice response system when the user is not classified as wanting a concrete call type.

17. The method of claim 16, wherein a previously encoded assumption by the previously encoded assumption dialog motivator triggers transferring the user to a customer service representative when the user is not classified as wanting a concrete call type.

18. The method of claim 16, wherein a previously encoded assumption by the previously encoded assumption dialog motivator triggers transferring the user to an interactive voice response system when the call type is classified as a vague call.

19. The method of claim 16, wherein before the spoken dialog service transfers the user to the main menu, the spoken dialog service requests the user's telephone number.

20. The method of claim 17, the method further comprising, before transferring the user to the customer service representative, requesting a telephone number from the user.

* * * * *